United States Patent
Hadjimichael

(10) Patent No.: US 6,688,759 B1
(45) Date of Patent: Feb. 10, 2004

(54) PLANT GROWTH-ENHANCING LAMP DEVICE

(76) Inventor: Andrew Hadjimichael, 2050 Davebrook Road, Mississauga, Ontario (CA), L5J 3M5

( * ) Notice: Subject to any disclaimer, the term of this patent is extended or adjusted under 35 U.S.C. 154(b) by 0 days.

(21) Appl. No.: 10/145,485

(22) Filed: May 15, 2002

(51) Int. Cl.⁷ .................................................. F21S 8/06
(52) U.S. Cl. ........................ 362/405; 362/406; 362/427; 362/805
(58) Field of Search ........................ 362/147, 247–805, 362/238, 239

(56) References Cited

U.S. PATENT DOCUMENTS

| | | | | |
|---|---|---|---|---|
| 3,831,022 A | * | 8/1974 | Porter et al. | 362/406 |
| 4,442,993 A | * | 4/1984 | Tseng | 248/327 |
| 4,748,549 A | * | 5/1988 | Scheer | 362/406 |
| 6,371,632 B1 | * | 4/2002 | Lavy | 362/406 |
| 2002/0163813 A1 | * | 11/2002 | Tseng | 362/404 |

FOREIGN PATENT DOCUMENTS

| | | | | |
|---|---|---|---|---|
| FR | 002679012 A | * | 1/1993 | |
| SU | 1636619 A | * | 3/1991 | |

* cited by examiner

Primary Examiner—Sandra O'Shea
Assistant Examiner—Hargobind S. Sawhney

(57) ABSTRACT

A plant growth-enhancing lamp device for enhancing the growth of indoor grown plants. The plant growth-enhancing lamp device includes a chandelier structure including a bracket member for mounting the chandelier structure to a wall structure, and also including an elongate tubular member being attached to the bracket member, and further including a housing member being attached to the elongate tubular member, and also including a plurality of branch members being hingedly attached to the housing member, and further including a plurality of light-emitting members being attached to the housing member and to the branch members, and also including a power cord being connected to the light-emitting members.

5 Claims, 4 Drawing Sheets

PLANT GROWTH-ENHANCING LAMP DEVICE

BACKGROUND OF THE INVENTION

1. Field of the Invention

The present invention relates to plant lighting members and more particularly pertains to a new plant growth-enhancing lamp device for enhancing the growth of indoor grown plants.

2. Description of the Prior Art

The use of plant lighting members is known in the prior art. More specifically, plant lighting members heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,012,609; U.S. Pat. No. 4,914,858; U.S. Pat. No. 5,660,461; U.S. Pat. No. 4,742,432; U.S. Pat. No. 4,170,844; and U.S. Pat. No. Des. 405,426.

While these devices fulfill their respective, particular objectives and requirements, the aforementioned patents do not disclose a new plant growth-enhancing lamp device. The prior art includes inventions having light-emitting members for effecting plant growth indoors.

SUMMARY OF THE INVENTION

The general purpose of the present invention, which will be described subsequently in greater detail, is to provide a new plant growth-enhancing lamp device which has many of the advantages of the plant lighting members mentioned heretofore and many novel features that result in a new plant growth-enhancing lamp device which is not anticipated, rendered obvious, suggested, or even implied by any of the prior art plant lighting members, either alone or in any combination thereof. The present invention includes a chandelier structure including a bracket member for mounting the chandelier structure to a wall structure, and also including an elongate tubular member being attached to the bracket member, and further including a housing member being attached to the elongate tubular member, and also including a plurality of branch members being hingedly attached to the housing member, and further including a plurality of light-emitting members being attached to the housing member and to the branch members, and also including a power cord being connected to the light-emitting members. None of the prior art describes inventions having the chandelier structure of the present invention.

There has thus been outlined, rather broadly, the more important features of the plant growth-enhancing lamp device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new plant growth-enhancing lamp device which has many of the advantages of the plant lighting members mentioned heretofore and many novel features that result in a new plant growth-enhancing lamp device which is not anticipated, rendered obvious, suggested, or even implied by any of the prior art plant lighting members, either alone or in any combination thereof.

Still another object of the present invention is to provide a new plant growth-enhancing lamp device for enhancing the growth of indoor grown plants.

Still yet another object of the present invention is to provide a new plant growth-enhancing lamp device that is easy and convenient to attach to any ceiling structure in particular.

Even still another object of the present invention is to provide a new plant growth-enhancing lamp device that emits light within a particular wavelength range for producing chlorophyll in the plants to effect growth.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
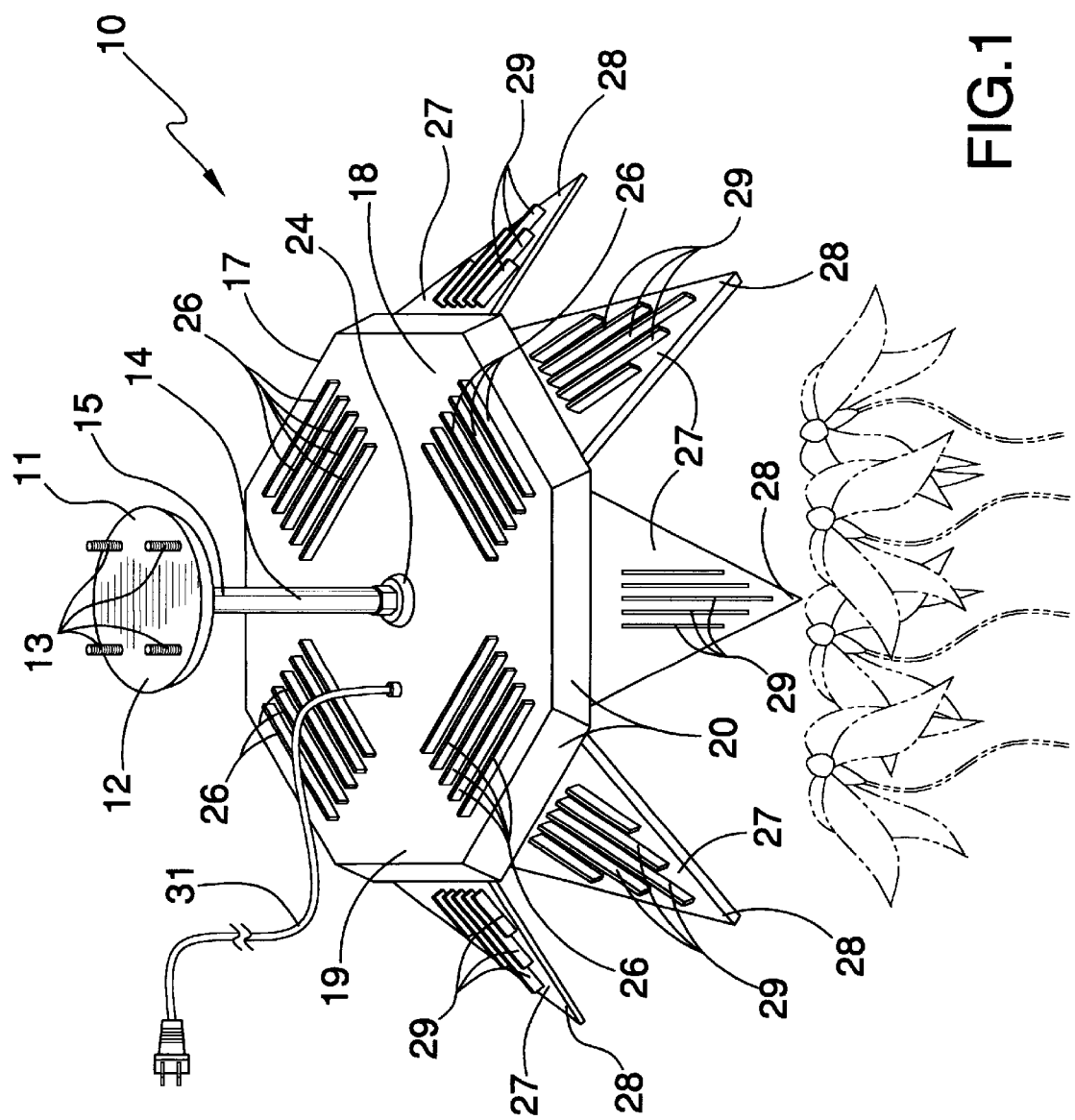
FIG. 1 is a perspective view of a new plant growth-enhancing lamp device according to the present invention and shown in use.
Figure 2:
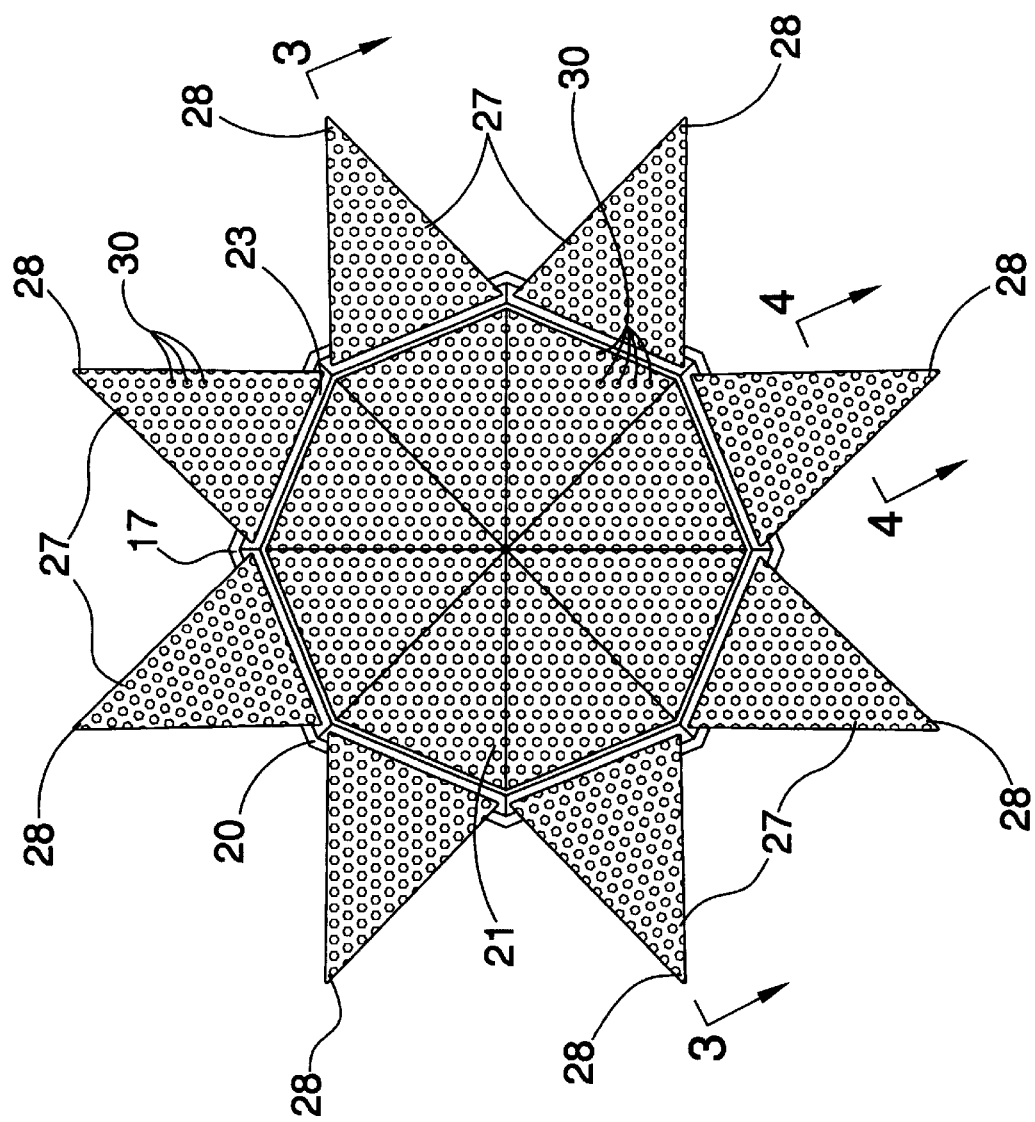
FIG. 2 is a bottom plan view of the present invention.
Figure 3:
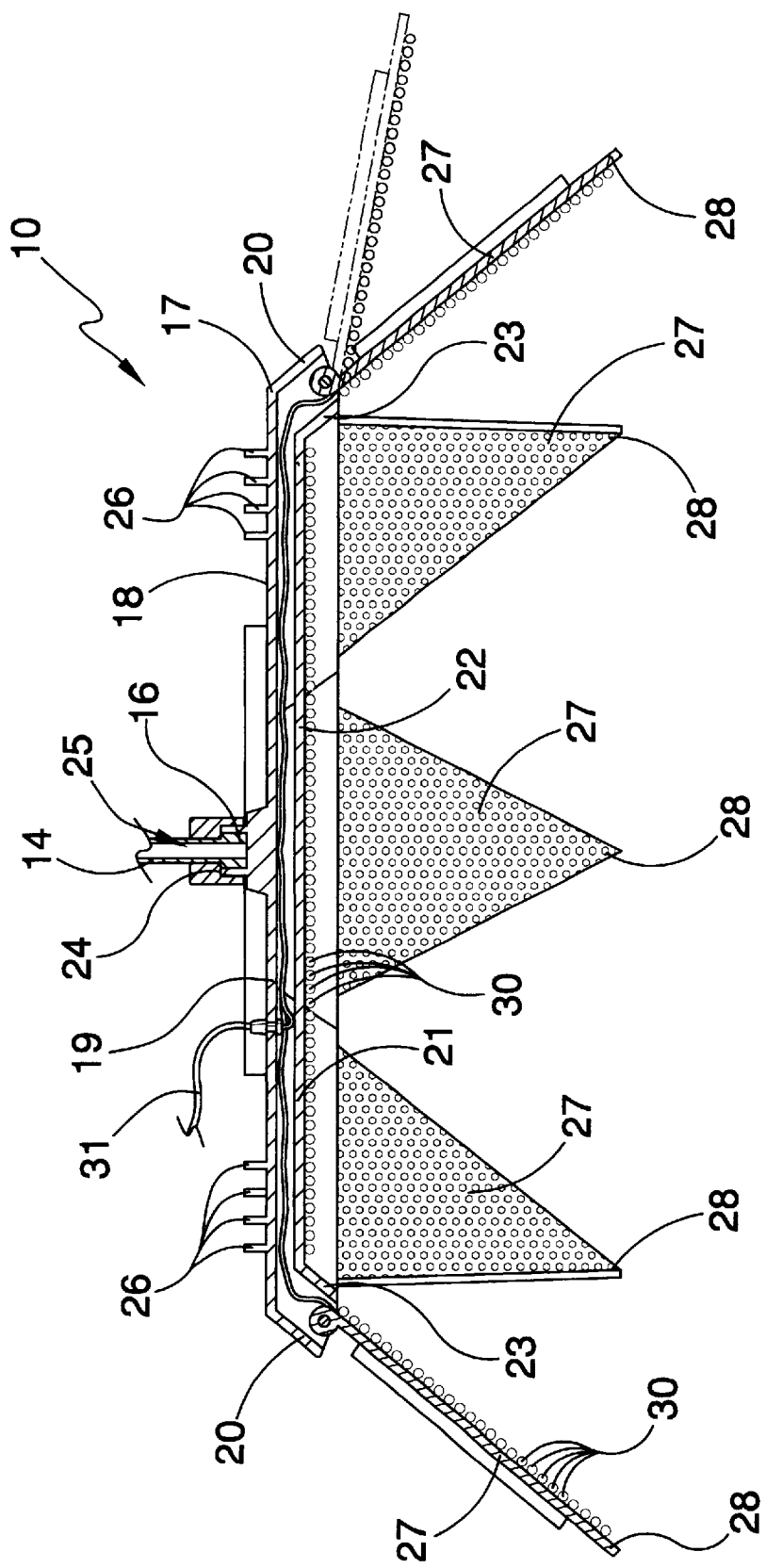
FIG. 3 is a cross-sectional view of the present invention.
Figure 4:
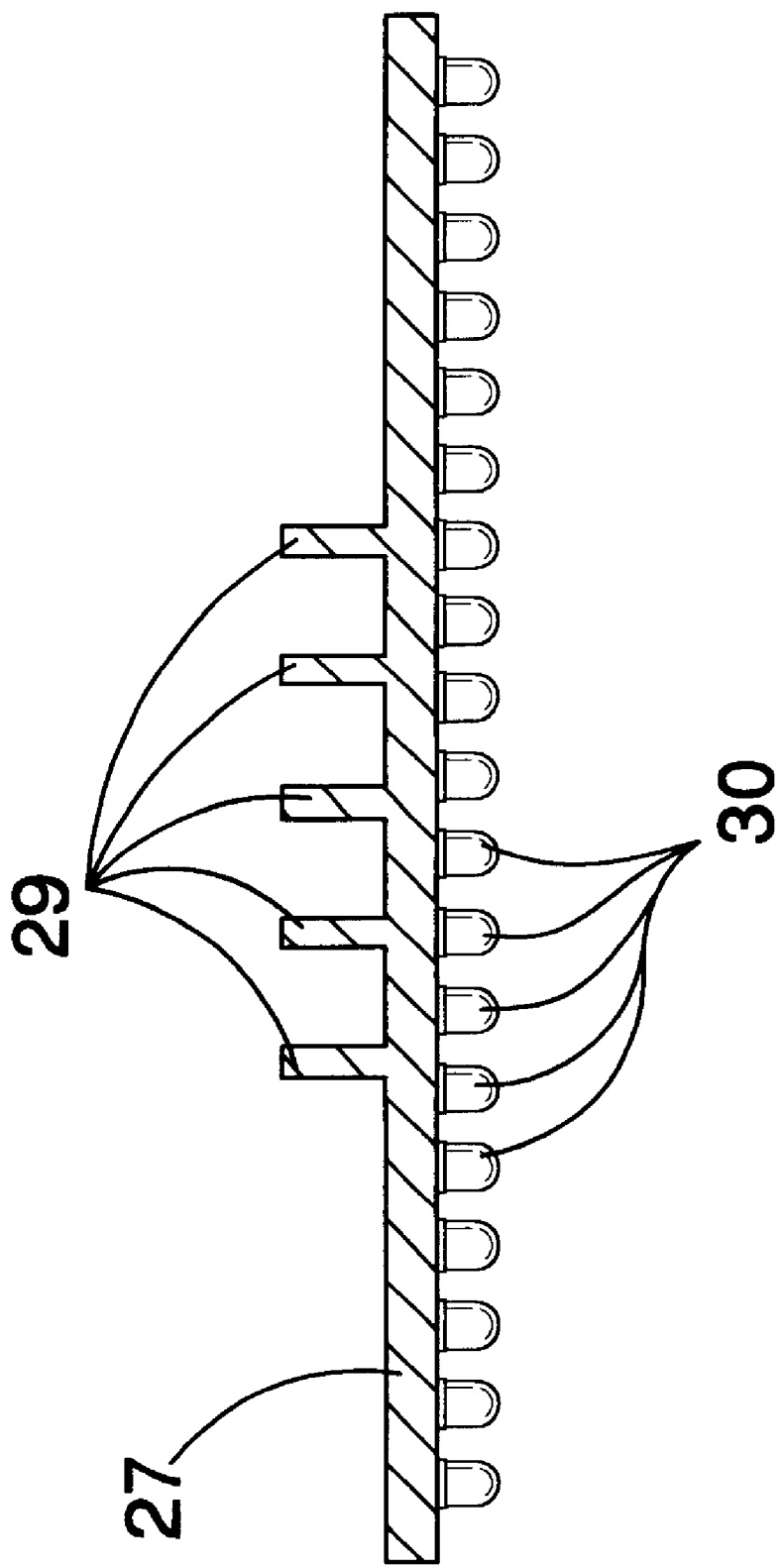
FIG. 4 is a detailed cross-sectional view of one of the louvers of the present invention.

With reference now to the drawings, and in particular to FIGS. 1 through 4 thereof, a new plant growth-enhancing lamp device embodying the principles and concepts of the present invention and generally designated by the reference numeral 10 will be described.

As best illustrated in FIGS. 1 through 4, the plant growth-enhancing lamp device 10 generally comprises a chandelier structure including a bracket member 11 for mounting the chandelier structure to a wall structure, and also including an elongate tubular member 14 being conventionally attached to the bracket member 11, and further including a housing member 17 being conventionally attached to the elongate tubular member 14, and also including a plurality of branch members 27 being hingedly and conventionally attached to the housing member 17, and further including a plurality of light-emitting members 30 being conventionally attached to the housing member 17 and to the branch members 27, and also including a power cord 31 being conventionally connected to the light-emitting members 30. The bracket member 11 includes a plate 12 having a plurality of threaded fasteners 13 being conventionally extended therefrom for attaching to the wall structure such as a ceiling. The elongate tubular member 14 has a first end 15 which is securely and conventionally attached to the plate 12, and also includes a second end 16. The housing member 17 includes a top wall 18 having a boss 24 being conventionally disposed upon a top side thereof and having a bore 25 therein, and also includes a bottom wall 21. The top and bottom walls 18,21 further have main portions 19,22 and perimeter portions 20,23 which are angled downwardly relative to the main portions 19,22 and also have multiple edges. The second end 16 of the elongate tubular member 14 is securely and conventionally received in the boss 24 of the top wall 18. The chandelier structure further includes a plurality of first louvers 26 being arranged in sets of first louvers and being disposed through the top wall 18 to effect cooling of the light-emitting members 30. The branch members 27 are arrowhead-shaped and have edges which are opposite to vertex tips 28 thereof and which are hingedly and conventionally attached to the perimeter portions 20,23 of the top and bottom walls 18,21 and which can be pivotally adjusted upwardly and downwardly as selected by a user with the vertex tips 28 being distally-disposed relative to the perimeter portions 20,23. The chandelier structure also includes a plurality of second louvers 29 being disposed through the branch members 27 and being extended between the vertex tips 28 and the opposite edges of the branch members 27. The light-emitting members 30 are securely and conventionally attached upon a bottom of the bottom wall 21 of the housing member 17 and upon undersides of the branch members 27, and are approximately 1600 light-emitting diodes with approximately 1200 being red light-emitting diodes each having a wavelength of 660 millimicrons and also with 400 being white light-emitting diodes each having a peak wavelength of 450 nanometers for effective plant growth.

In use, the chandelier structure is preferably attached to a ceiling and the power cord 31 is plugged into a conveniently-located electrical outlet for energizing the light-emitting members 30 to effect the particular light wavelength upon houseplants proximately located thereby. The light-emitting members will cause the generation of chlorophyll in the houseplants.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the plant growth-enhancing lamp device.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant growth-enhancing lamp device comprising:

a chandelier structure including a bracket member for mounting said chandelier structure to a wall structure, and also including an elongate tubular member being attached to said bracket member, and further including a housing member being attached to said elongate tubular member, and also including a plurality of branch members being hingedly attached to said housing member, and further including a plurality of light-emitting members being attached to said housing member and to said branch members, and also including a power cord being connected to said light-emitting members, said bracket member including a plate having a plurality of threaded fasteners being extended therefrom for attaching to the wall structure such as a ceiling, said elongate tubular member having a first end which is securely attached to said plate, and also including a second end, said housing member including a top wall having a boss being disposed upon a top side thereof and having a bore therein, and also including a bottom wall, said top and bottom walls further having main portions and perimeter portions which are angled downwardly relative to said main portions and also having multiple edges, said second end of said elongate tubular member being securely received in said boss of said top wall.

2. A plant growth-enhancing lamp device as described in claim 1, wherein chandelier structure further includes a plurality of first louvers being arranged in sets of first louvers and being disposed through said top wall to effect cooling of said light-emitting members.

3. A plant growth-enhancinig lamp device as described in claim 2, wherein said branch members are arrowhead-shaped and have edges which are opposite to vertex tips thereof and which are hingedly attached to said perimeter portions of said top and bottom walls and which can be pivotally adjusted upwardly and downwardly as selected by a user with said vertex tips being distally-disposed relative to said perimeter portions.

4. A plant growth-enhancing lamp device as described in claim 3, wherein said chandelier structure also includes a plurality of second louvers being disposed through said branch members and being extended between said vertex tips and said opposite edges of said branch members.

5. A plant growth-enhancinig lamp device as described in claim 4, wherein said light-emitting members are securely attached upon a bottom of said bottom wall of said housing and upon undersides of said branch members, and are approximately 1600 light-emitting diodes with approximately 1200 being red light-emitting diodes each having a wavelength of 660 millimicrons and also with 400 being white light-emitting diodes each having a peak wavelength of 450 nanometers for effective plant growth.

* * * * *